United States Patent [19]

Ferrell et al.

[11] Patent Number: 4,688,186

[45] Date of Patent: Aug. 18, 1987

[54] DIVISION BY A CONSTANT BY ITERATIVE TABLE LOOKUP

[75] Inventors: Charles W. Ferrell, Phoenix; Thomas H. Howell, Scottsdale, both of Ariz.

[73] Assignee: Honeywell Bull Inc., Phoenix, Ariz.

[21] Appl. No.: 752,432

[22] Filed: Jul. 8, 1985

Related U.S. Application Data

[63] Continuation of Ser. No. 432,482, Oct. 4, 1982, abandoned.

[51] Int. Cl.⁴ ................................................ G06F 7/52
[52] U.S. Cl. .................................................... 364/764
[58] Field of Search .............. 364/764, 763, 762, 761

[56] References Cited

U.S. PATENT DOCUMENTS

| | | | |
|---|---|---|---|
| 3,344,261 | 9/1967 | Hornung | 364/761 |
| 3,917,935 | 11/1975 | Lazecki | 364/761 |
| 3,925,649 | 12/1975 | Haeusler | 364/763 |
| 4,374,427 | 2/1983 | Katayama | 364/764 |
| 4,466,077 | 8/1984 | Iannucci et al. | 364/763 |

OTHER PUBLICATIONS

Hemel, "Making Small ROM's do Math Quickly, Cheaply & Easily", *Electronics*, May 11, 1970, pp. 104–111.

*Primary Examiner*—David H. Malzahn
*Attorney, Agent, or Firm*—A. A. Sapelli; J. S. Solakian

[57] ABSTRACT

A bit-string address or a multi-bit character count is converted to a real word memory address by division by a constant value. The division is accomplished without reference to an arithmetic logic unit. Division is accomplished by means of a look-up table stored in a ROM with the quotient and remainder values being stored in the ROM. The provided address, or dividend, values are used to address the ROM to determine the quotient and remainder values corresponding thereto. When the dividend values are of a dimension larger than can be divided by a single pass at the ROM, the division is accomplished by several successive passes through the ROM to provide a succession of partial quotient values. The resulting quotient and remainder values define the proper address for the computer memory.

2 Claims, 5 Drawing Figures

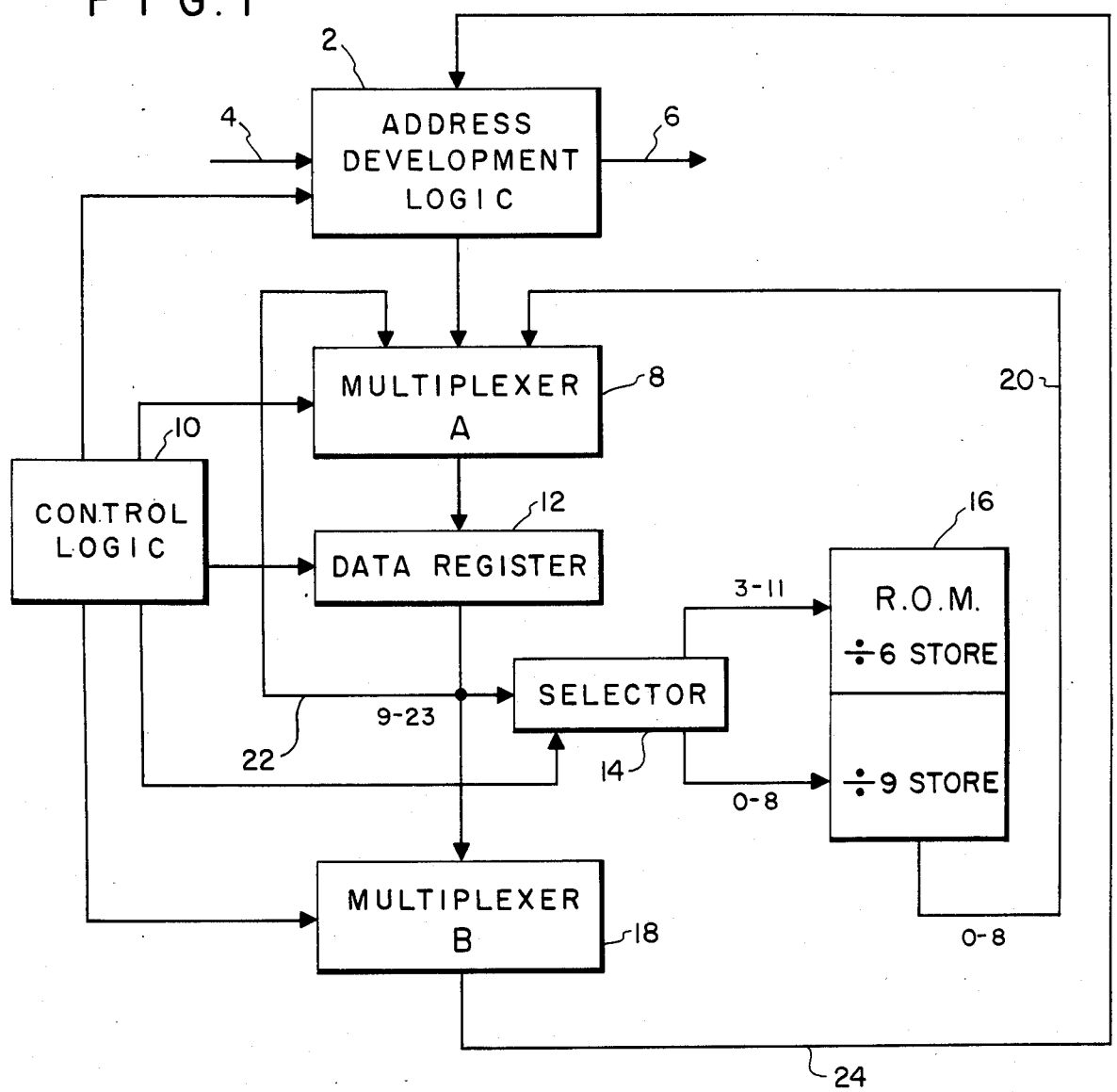
FIG. 1
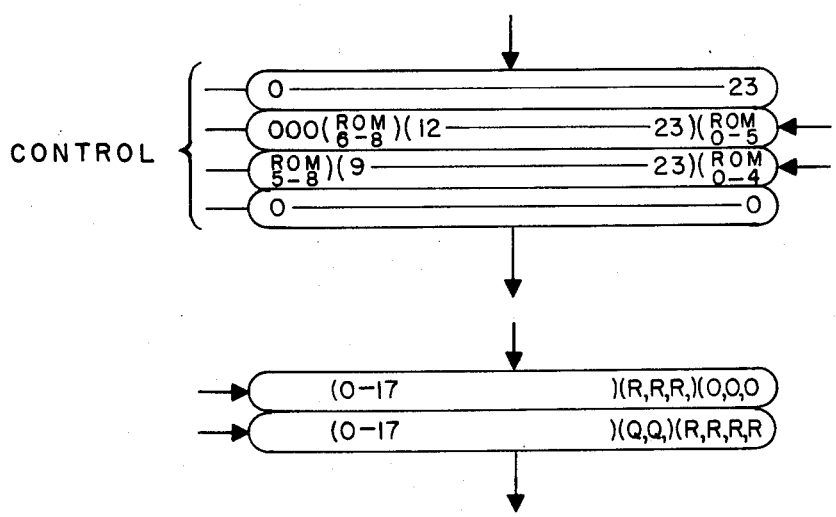
FIG. 4
FIG. 5

DIVIDE BY SIX

| DATA REG. POS. | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| START | 0 | 0 | 0 | A | B | C | D | E | F | G | H | I | J | K | L | M | N | O | P | Q | R | S | T | U |
| 1st PASS | 0 | 0 | 0 | $R_0$ | $R_0$ | $R_0$ | J | K | L | M | N | O | P | Q | R | S | T | U | $Q_0$ | $Q_0$ | $Q_0$ | $Q_0$ | $Q_0$ | $Q_0$ |
| 2nd PASS | 0 | 0 | 0 | $R_1$ | $R_1$ | $R_1$ | P | Q | R | S | T | U | $Q_0$ | $Q_0$ | $Q_0$ | $Q_0$ | $Q_0$ | $Q_0$ | $Q_1$ | $Q_1$ | $Q_1$ | $Q_1$ | $Q_1$ | $Q_1$ |
| 3rd PASS | 0 | 0 | 0 | $R_2$ | $R_2$ | $R_2$ | $Q_0$ | $Q_0$ | $Q_0$ | $Q_0$ | $Q_0$ | $Q_0$ | $Q_1$ | $Q_1$ | $Q_1$ | $Q_1$ | $Q_1$ | $Q_1$ | $Q_2$ | $Q_2$ | $Q_2$ | $Q_2$ | $Q_2$ | $Q_2$ |
| MUX. B OUT | $Q_0$ | $Q_0$ | $Q_0$ | $Q_0$ | $Q_0$ | $Q_0$ | $Q_1$ | $Q_1$ | $Q_1$ | $Q_1$ | $Q_1$ | $Q_1$ | $Q_2$ | $Q_2$ | $Q_2$ | $Q_2$ | $Q_2$ | $Q_2$ | $R_2$ | $R_2$ | $R_2$ | 0 | 0 | 0 |

← 18-BIT WORD ADDRESS → | 6-BIT BYTE POSITION WITHIN WORD

FIG. 2

DIVIDE BY NINE

| DATA REG. POS. | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| START | A | B | C | D | E | F | G | H | I | J | K | L | M | N | O | P | Q | R | S | T | U | V | W | X |
| 1st PASS | $R_0$ | $R_0$ | $R_0$ | $R_0$ | J | K | L | M | N | O | P | Q | R | S | T | U | V | W | X | $Q_0$ | $Q_0$ | $Q_0$ | $Q_0$ | $Q_0$ |
| 2nd PASS | $R_1$ | $R_1$ | $R_1$ | $R_1$ | O | P | Q | R | S | T | U | V | W | X | $Q_0$ | $Q_0$ | $Q_0$ | $Q_0$ | $Q_0$ | $Q_1$ | $Q_1$ | $Q_1$ | $Q_1$ | $Q_1$ |
| 3rd PASS | $R_2$ | $R_2$ | $R_2$ | $R_2$ | T | U | V | W | X | $Q_0$ | $Q_0$ | $Q_0$ | $Q_0$ | $Q_0$ | $Q_1$ | $Q_1$ | $Q_1$ | $Q_1$ | $Q_1$ | $Q_2$ | $Q_2$ | $Q_2$ | $Q_2$ | $Q_2$ |
| 4th PASS | $R_3$ | $R_3$ | $R_3$ | $R_3$ | $Q_0$ | $Q_0$ | $Q_0$ | $Q_0$ | $Q_0$ | $Q_1$ | $Q_1$ | $Q_1$ | $Q_1$ | $Q_1$ | $Q_2$ | $Q_2$ | $Q_2$ | $Q_2$ | $Q_2$ | $Q_3$ | $Q_3$ | $Q_3$ | $Q_3$ | $Q_3$ |
| MUX. B OUT | $Q_0$ | $Q_0$ | $Q_0$ | $Q_0$ | $Q_0$ | $Q_1$ | $Q_1$ | $Q_1$ | $Q_1$ | $Q_1$ | $Q_2$ | $Q_2$ | $Q_2$ | $Q_2$ | $Q_2$ | $Q_3$ | $Q_3$ | $Q_3$ | $Q_3$ | $Q_3$ | $R_3$ | $R_3$ | $R_3$ | $R_3$ |

← 18-BIT WORD ADDRESS → | 9 BIT BYTE WITHIN WORD | BIT POSITION WITHIN BYTE

FIG. 3

DIVISION BY A CONSTANT BY ITERATIVE TABLE LOOKUP

This is a continuation of co-pending, Ser. No. 432,482, filed on Oct. 4, 1982, now abandoned.

BACKGROUND OF THE INVENTION

The present invention relates to computer apparatus. More particularly, it relates to an apparatus and a method for dividing a number by a constant.

In computer apparatus, data is stored in the memory portion of the computer in accordance with a predetermined format. Under such circumstances, the memory may be addressed in accordance with straightforward addressing procedures. On the other hand, it is not unusual that data or instructions are received by the computer with the address information in a different format. For example, in one such format the address information may be in the form of a count of six-bit characters. In such a case, in order to render that address usable, the address information must be divided by a factor of six. Such a transaction in computers heretofore have been accomplished by effecting the division in arithmetic logic units of the computer processor.

On other occasions, the information may be received as a bit count or a so-called bit-string format of information. While the bit string type of information is received as a continuous stream of bits of data, as many as $2^{24}$ bits, it is recorded in the memory in the form of 36-bit words each consisting of four 9-bit bytes. In order to find the specific address identified by the bit-count number with respect to the words and bytes stored in the memory, it is necessary to divide the bit-count number by 36 to find the word then further divide the word and find the byte and bit position of the start of the memory transaction. Again such division is usually accomplished by referring the bit-count number to the arithmetic logic unit of the computer to effect the necessary division.

The referring of the 6-bit character count or the bit-string count number to the arithmetic logic unit of the computer to effect the necessary divisions to find the proper address for the transaction, is a necessarily slow process which impedes the data handling rate of the computer as well as tying up the arithmetic logic unit for the purpose of identifying the proper address.

SUMMARY OF THE INVENTION

It is, accordingly, an object of the present invention to provide improved means and methods for addressing a computer memory while obviating the shortcomings of the prevailing systems.

It is another object of the present invention to provide an improved means and methods for effecting division by a constant without recourse to an arithmetic logic unit.

In accomplishsing these and other objects, there has been provided, in accordance with the present invention, means and method for converting a bit-string address or a multi-bit character count address to a memory address by dividing the provided address by a constant. The division is accomplished without reference to an arithmetic logic unit. Division is accomplished by means of a look-up table stored in a ROM with the quotient and remainder values being stored in the ROM. The provided address, or dividend, values are used to address the ROM to determine the quotient and remainder values corresponding thereto. When the dividend values are of a dimension larger than can be divided by a single pass at the ROM, the division is accomplished by several successive passes through the ROM to accomplish the desired division. The resulting quotient and remainder values define the proper address for the computer memory.

BRIEF DESCRIPTION OF THE DRAWINGS

A better understanding of the present invention may be had from the following detailed description when read in the light of the accompanying drawings in which:

FIG. 1 is a logic block diagram of that portion of a computer's system embodying the present invention;

FIG. 2 and FIG. 3 are charts illustrating the implementation of the present invention;

FIG. 4 is a detailed illustration of a portion of the structure illustrated in FIG. 1; and FIG. 5 is a detailed illustration of a second portion of the structure shown in FIG. 1.

DETAILED DESCRIPTION

Referring now to the drawings in more detail, there is shown in FIG. 1 the pertinent components of a computer system which embody the present invention. Particularly, there is shown an address development logic 2. The address development logic 2 is coupled to receive address information on an input lead 4 and, after evolving the address information in a form suitable for use by the computer, to transmit that address information into the computer system by way of an output connection 6. When the address information is received by the address development logic unit 2 and is in a format which requires division by a constant in order to put it in a proper format usable by the computer, the address information is transmitted through a first multiplexer 8 under the control of a control logic unit 10, to a data register 12. In response to control signals from the control logic 10, selected bits of the data stored in the register 12 are transmitted to a selector 14. The selector 14 in response to a control signal from the control logic unit 10 transmits those selected bits to a first or second portion of a ROM 16 as address bits.

In an exemplary embodiment constructed in accordance with the present invention, the ROM 16 was in the form of a so-called 1K × 10 ROM. Of this ROM, the upper half was dedicated to a divide-by-six store while the lower half was dedicated to a divide-by-nine store. The selector 14, accordingly, presents a ten-bit address, including the selector bit, to the ROM 16. Each address in the ROM, accordingly, includes nine bits of data. In the divide-by-six store, that nine bits of data includes six bits of quotient and three bits of remainder at each address. The tenth bit may be used as a parity bit. In the divide-by-nine store, the nine bits of data are arranged as five bits of quotient and four bits of remainder. In the divide-by-six operation, no remainder can exceed the value of five. Accordingly, the three data bits are adequate to express any possible remainder in a divide-by-six situation. On the other hand, in a divide-by-nine situation, no remainder can exceed a value of eight. Accordingly, four bits of data are required to encompass any possible remainder.

The ROM 16, as was hereinbefore noted, was, in the exemplary embodiment, a nominal 1K by 10 ROM. The upper 512 addresses for the ROM were relegated to the divide by six store while the lower 512 addresses were relegated to the divide by nine store. Each of the 512 addresses for the divide by six store represents a 9 bit dividend. At the addressed location, the first 6 bits represent the quotient of the presented dividend divided by 6. The next three bit positions in each address of the upper section of the ROM 16 represents a 3 bit remainder. Thus bits 0-5 at the output of the ROM 16, in the divide by six mode, represents quotient values while bits 6-8 represent remainder values.

Inasmuch as it is likely that the dividend will be larger than the 9-bit address, more than one pass through the multiplexer 8, the data register 12, the selector 14 and the ROM 16 is required. To that end, the addressed quotient in the ROM is transmitted by a bus 20 to an input of the multiplexer 8. As will be more clearly shown hereinafter, the quotient and remainder bits are selectively positioned in the multiplexer 8 and, correspondingly in the data register 12. Assuming that the multiplexer 8 and, the data register 12 each accommodate a 24-bit word, selected bit positions from the data register 12 are coupled by way of a register bus 22 to the input of the multiplexer 8 with the respective bit positions being selectively shifted. This relationship will be set forth more fully hereinafter.

When the required number of passes through the system have been accomplished in order to effect a desired division of the entire dividend, the data register 12, under the control of the logic control unit 10, transmits the accumulated quotient with its appropriate remainder to the input of a multiplexer 18, again with the bit positions of the quotient and remainder shifted as will be more fully set forth hereinafter. Under the control of the control logic unit 10, the multiplexer 18 then transmits the assembled quotient and remainder data to the input of the address development logic unit 2 by way of a return bus 24. The address development logic 2 is then controlled to transmit the resultant address information to the appropriate operational unit of the computer system.

The chart shown in FIG. 2 is illustrative of the procedures followed in carrying out the divide-by-six operation. As previously observed, the data register 12, of FIG. 1, is assumed to accommodate 24 bit positions numbered 0-23. These bit positions of the data register are indicated at the upper row of numbers on the chart shown in FIG. 2. In the exemplary embodiment, address information is supplied to the address development logic unit 2 by way of the input connection 4. Assuming, initially, that the address information is in the format of a 6-bit character count which must be divided by six to produce the real word address for the computer memory units, the address information is transmitted to a first level segment of the multiplexer 8. It is further assumed that the address information is 21 bits in length. Each segment of a multiplexer 8 is designed to accommodate 24 bits of information. In accordance with the present invention, the first three bits, bit positions 0, 1 and 2 are wired with 0s. The 21 bits of information from the address development logic unit 2 are transmitted to bit positions 3-23 of the first segment of the multiplexer 8. These bits are loaded directly, in the same order, into the data register 12, as shown at the line designated START on FIG. 2. Under the control of the control logic 10, a portion of the data in the data register 12 is transmitted to the selector 14. Again under the control of the control logic 10 the selector 14 is conditioned to distinguish between a divide-by-six or a divide-by-nine process. In the divide by six mode, address bits corresponding to bits 3-11 from the data register 12 are transmitted to the divide by six portion of the ROM 16 as address data. The bits corresponding to bits 9-23 from the data register 12 are returned by the register bus 22 to the input of the multiplexer 8.

As may be seen in FIG. 4, the logical structure of the multiplexer 8 which is in the form of a gating means which includes four segment levels, each receptive of 24 bits of information. The first segment level is arranged to receive the address information directly from the address development logic unit 2 in an unmodified arrangement. The second segment level of the multiplexer 8 is arranged to be operative in accordance with a divide-by-six procedure. To that end, the first three positions of the second segment level of the multiplexer 8 is wired with 0s. The next three positions in the second segment level of the multiplexer 8 are loaded with bits number 6-8 of the divide-by-six portion of the ROM 16. These three positions represent, as will be shown hereinafter, the remainder portion of the first stage of division. Bit positions 6-17 of the second segment level of the multiplexer 8 are loaded with bits 12-23 from the data register 12. In the divide-by-six procedure, bits 9-11 return to the input of the multiplexer 8 by way of the register bus 22 are discarded. Bit positions 18-23 of the second segment level of the multiplexer 8 are loaded with bit positions 0-5 from the divide by six portion of the ROM 16. These bit positions from the ROM 16 represent a 6-bit quotient for the first pass division through the apparatus.

In the divide by six store portion of the ROM 16, there are, in the exemplary embodiment, 512 input addresses. At each of the numerical addresses, there is a 9-bit representation of the corresponding input address number divided-by-six to produce a 6-bit quotient number and a 3-bit remainder number. It should be noted that the largest number which, when divided by 6, can be expressed as a 6-bit quotient and a 3 bit remainder is the number 383, or, as expressed in octal notation, 577. Accordingly, addresses in the divide by six store of the ROM 16 of 384 to 511, or expressed in octal terms from 600 to 777 will access truncated values. That is, the address notations from address 384 to 511 will address values representing the quotient minus 64. In octal notation this will be the equivalent of truncating the quotient number by 100. The computer, not as a part of the present invention, will make note of the truncation. The truncation occurs only on the first pass.

After the first pass, through the system, the data bits transmitted to the second segment level of the multiplexer 8 or gating element is passed to the data register 12 in the format illustrated on the line in FIG. 2 designated First Pass. Thus, after the first pass, the content of the data register 12 will be as follows. The first three positions will be loaded with 0s. The next three positions will contain the three remainder bits $R_0$ from the first pass division from the divide-by-six store of the ROM 16. The next 12 positions in the data register will be occupied by the data in bit positions 12-23 of the original dividend. Finally, the bit positions 18-23 of the data register will be occupied by the quotient bit designated $Q_0$ from the first pass division.

A second pass division is accomplished in a manner identical to that set forth in connection with the first pass division. That is, the data in bit positions 3-11 of the data register 12 are transferred to the selector 14 where the bits are used to address the divide-by-six store of the ROM 16. At the same time, bits 9-23 are fed back to the input of the multiplexer 8 by way of the bus 22. Of those bits 9-23, bits numbered 12-23 are gated through the second segment level of the multiplexer 8, in bit positions 6-17 thereof. Again, from the ROM divide-by-six store, bits numbered 0-8 are also returned to the second segment level of the multiplexer 8 wherein bits 6-8 are gated through bit positions 3-5 while bit positions 0-5 from the ROM are gated through bit positions 18-23 of the second segment level of the multiplexer 8. That data is then transmitted under control of logic unit 10 to the data register 12 as before.

After the second pass division, the content of the data register 12 is as indicated in the line of FIG. 2 designated Second Pass. That is, the first three positions are loaded with 0s, the next three positions are loaded with the remainder bits $R_1$ from the divide-by-six store portion of the ROM 16. The next 12 bits in the data register are occupied by bits position 12-23 of the previous content of the data register 12. These 12 bits correspond to the last six bits of the original dividend plus the first six bits of the quotient designated $Q_0$. The last six bits of the data register are occupied by the quotient result, position 0-5 from the divide-by-six store of the ROM 16, designated $Q_1$.

That content of the data register is now used to effect a third pass through the division procedure which is identical to the two previous passes. That is, bits 9-23 are returned by way of the bus 22 to the input of the multiplexer 8 where bits 12-23 are entered into bit positions 6-17 of the second segment level of the multiplexer 8. Bits 3-11 are transmitted through the selector 14 to address the divide-by-six store of the ROM 16. The quotient and remainder data from this division step of the ROM 16 are returned to the input of the multiplexer 8 wherein the remainder bits designated $R_2$ are entered into positions 3-5 while the quotient portion bits 0-5 are entered into bit positions 18-23. The data bits thus transmitted to the second segment level of the multiplexer 8 is then, under the control of the control logic unit 10 passed to the data register 12.

At this point, the control logic unit 10 recognizes that the division process has been completed and effects a transfer of the content of the data register 12 to a first segment level of the second multiplexer 18 with the content format shifted as indicated in the line designated MUX B Out of FIG. 2. That is, the quotient bits occupying bit positions 6-23 in the data register are entered in the second segment level of the MUX B 18 as bit positions 0-17. The final remainder bits designated R2 are entered into the second segment level of the MUX B 18 in positions bits 18-20 and the three 0s are entered into bit positions 21-23. The resultant, as indicated in FIG. 2, is an 18-bit word address and a three-bit designation, the $R_2$ bits, for a 6-bit byte position within the 18-bit addressed word. This content of the second level segment of the multiplexer 18 is returned by the return bus 24 to an input of the address development logic unit 2. This address is one that may be used to address the computer memory units and as such is transmitted thereto by means of the bus 6.

When the address information is supplied in a bit-string format, as was previously herein noted, the bit-string data is recorded as groups of 36-bit words. In order to find the proper word in which the starting point of the address occurs it is necessary to divide the bit-string data by 36. In accordance with the present invention, the division-by-36 is accomplished by first effecting a divide-by-nine and then effecting a divide-by-four. The divide-by-nine is accomplished in a manner substantially identical to that set forth in connection with the divide-by-six procedure with certain exceptions as will be apparent hereinafter.

In the divide-by-nine procedure, the control logic unit 10 causes the selector 14 to address the divide-by-nine store portion of the ROM 16. Here, too, the divide-by-nine store occupies 512 addressed from the 1K ROM. The addresses have successive numeral values from 0-511. At each such address there is stored a nine-bit number representative of the division of the numerical value of the address by nine. Each nine-bit number is in the form of a five-bit quotient and a four-bit remainder. The tenth bit at each address may be used as a parity bit. Since the largest number divided by 9 that can be expressed by a five-bit quotient and a four-bit remainder is 287 with a base 10 notation. In octal notation, that number 437. Since, on the first pass through the division process, the dividend may exceed $287_{10}$ ($437_8$), the addresses for the divide-by-nine store of the ROM 16 between 288 and 511 (in octal notation 440 to 777) will access truncated values. In other words, the resultant quotient for addresses lying between 288 and 511 will address values representing the quotient minus 32 (octal 40).

Again, it will be appreciated that the truncation will only occur on the first pass through the division process of the divide-by-nine system. On subsequent passes the remainder cannot exceed $8_{10}$. Accordingly, the dividend on subsequent passes through the division process on a divide-by-nine procedure cannot exceed 287.

When an address information has been received which is recognized as being in the bit-string mode, the information is received into the address development logic unit 2 by way of the input bus 4, the control logic unit 10 will initiate the divide-by-nine process by transferring the dividend number representing the bit-string address through the first segment level of the multiplexer 8, with the 24 bits of information in the order received, into the 24 bit positions of the register 12. Thus, at the start of the divide-by-nine procedure, the content of the data register will be as shown at the line designated START on FIG. 3.

Again, under control of the control logic unit 10, a portion of the data in the data register 12, namely bit positions 9-23 are transferred to bit positions 4-18 of the third segment level of the gating means identified as A multiplexer 8. Bits 0-8 from the data register 12 are transmitted, by way of the selector 14, to the divide-by-nine store of the ROM 16. The nine-bit resultant from the divide-by-nine store is transmitted by the ROM bus 20 also to the third segment level of the A multiplexer 8, with bits 5-8 being placed into bit positions 0-3 while bits 0-4 are loaded through bit positions 19-23 of the third level segment of the A multiplexer 8 to the data register 12 in the same order. This order is as illustrated in FIG. 3 at the line labelled FIRST PASS. As may there by seen, bit positions 0-3 are occupied by a four-bit remainder, $R_0$, from the divide-by-nine store. Bit positions 4-18 are occupied by data which had previously been stored in positions 9-23 of the data register. Positions 19-23 of the data register are now occupied by five-bit quotient data from the divide-by-nine store. These are designated as $Q_0$.

For the next pass through the division process the procedure is exactly repeated. The bit positions 9-23 of the content of the data register are transferred by way of the bus 22 to the third segment level of the A multiplexer 8 into bit positions 4-18. Bit positions 0-8 are transmitted, by way of the selector 14 to address the divide-by-nine store portion of the ROM 16. Again, the 0-8 output bits from the divide-by-nine store are transmitted by way of the bus 20 to the third segment level of the multiplexer 8 with bit positions 5-8 being loaded into bit positions 0-3 of the third level segment of the A multiplexer 8 and bits 0-4 being loaded into bit positions 19-23 of the third level segment of the A multiplexer 8. Thus, arrangement of bits is again transferred to the data register 12 in that order. Thus, at the end of the second pass through the division process, the content of the data register is as shown on the line labelled SECOND PASS of FIG. 3. That is, bit positions 0-3 are occupied by the four remainder bits labeled $R_1$ on the second pass through the divide-by-nine store. Bit positions 4-13 are occupied by the remaining portions of the original dividend. Bit positions 14-18 are occupied by the $Q_0$ quotient bits from the first pass through the division process while bit positions 19-23 are occupied by the quotient bits $Q_1$ as a resultant of a second pass through the divide-by-nine process.

The identical procedure for a third pass through the divide-by-nine procedure results in having a data register loaded in the manner indicated at the line labelled THIRD PASS in FIG. 3. That is, bit positions 0-3 are occupied by the four remainder bits $R_2$ resulting from the third pass through the divide-by-nine process. Bit positions 4-8 are occupied by the last five remaining bits from the original dividend. Bit positions 9-13 are occupied by the first pass quotient bits $Q_0$. Bit positions 14-18 are occupied by the second pass quotient bits $Q_1$ and bit positions 19-23 are occupied by the five quotient bits $Q_2$ from the third pass through the divide-by-nine process.

After the fourth and final pass through the divide-by-nine process, following the identical procedure hereinbefore set forth, the content of the data register 12 will be as illustrated in the line of FIG. 3 designated FOURTH PASS. That is, bit positions 0-3 are occupied by the four remainder bits of the fourth pass division designated $R_3$. Bit positions 4-8 are occupied by the five quotient bits $Q_0$ resulting from the first division pass. Bit positions 9-13 are occupied by the quotient bit $Q_1$ resulting from the second pass through the divide-by-nine process, bit positions 14-18 are occupied by quotient bits $Q_2$ resulting from the third pass through the divide-by-nine process and bit positions 19-23 are occupied by quotient bits $Q_3$ resulting from the fourth pass through the divide-by-nine process.

Following the fourth pass through the process, the control logic unit 10 recognizes that the division process has been completed and translates the content of the data register 12 to the second segment level of the B multiplexer 18 as shown in FIG. 5. In translating the data from the data register 12 to the multiplexer 18, the bit positions are again shifted to the arrangement shown in the line designated MUX B OUT of FIG. 3. Namely, bit positions 0-19 are occupied by the quotient bits appearing in bit positions 4-23 of the data register 12. The remainder bits $R_3$ are loaded into bit positions 20-23 of the MUX B output. That resultant is effectively divided-by-four by a two-bit position shift right of the quotient data. Thus, the resultant divide-by-36 provides an 18 bit word address occupying bit positions 0-17 of the MUX B output. The two remaining quotient bits of $Q_3$ will then designate a nine-bit byte within the designated word. The four remainder bits $R_3$ designate a particular bit position within the designated nine-bit byte, thus completely identifying the bit position for the beginning of the bit-string address. This address is now transmitted by the bus 24 to the input of the address development logic 2 where it is then transmitted, by the bus 6, to the selected memory unit.

Thus, there has been provided, in accordance with the present invention, an effective method of dividing by a constant, exemplified by dividing-by-six or dividing-by-nine to provide a corrected and deciphered address in a memory when the received address was in the form of either a six-bit character count or a bit-string designation. The division is accomplished by reference to a lookup table using the received address as designated addresses in the lookup table to effect the required division, thereby avoiding the necessity of accomplishing the desired division by resort to the arithmetic logic units of the computer. As noted, this procedure effects a considerable saving in time and effort within the computer.

What is claimed is:

1. In a digital computer, having a storage means for storing a table of quantities, each quantity stored in an addressable location having a value associated therewith, each quantity including a quotient portion and a remainder portion corresponding to a division of the value of the addressable location by a predetermined constant, and having a switching means having a plurality of input terminals, and further having a register means, the switching means selecting predetermined data bits received at the plurality of input terminals in response to control signals thereby outputting data in a predetermined format and temporarily stored in said register means, said digital computer providing a method of dividing a dividend in the form of a binary number by the predetermined constant yielding a resulting quotient and a resulting remainder, said binary number comprising a plurality of binary bits having upper bits and lower bits, the uppermost bit being a most significant bit and the lowermost bit being a least significant bit, said dividend being operatively coupled to one of the input terminals of said switching means, said method comprising the steps of:

(a) forming a first dividend in said register means, said first dividend including a first grouping of the uppermost bits of said dividend, said first grouping containing a number of bits of said dividend equal to at least one greater than the number of bits sufficient to define a largest possible remainder the largest possible remainder being one less than the constant;

(b) utilizing the first dividend as the addressable location to access the table stored in said storage means;

(c) saving in the register means the binary bits of the quotient portion, resulting from accessing the storage means of step (b), as the uppermost bits of the resulting quotient;

(d) forming a new first dividend in said register means, wherein the switching means causes the uppermost positions of the new first dividend to include the binary bits of the remainder portion of the previous utilizing operation, and the lowermost positions of the new first dividend to include the uppermost bits of the dividend not included in the previous forming operation, such that the total number of bits of the new first dividend has the same number of bits as the first grouping;

(e) utilizing the new first dividend as the addressable location to access the table stored in said storage means;

(f) saving in the register means the binary bits of the quotient portion, resulting from accessing the storage means of step (e), as the next uppermost bits of the resulting quotient; and (g) repeating steps (d) through (f) until all the binary bits of the dividend have been utilized in the forming of the new first dividend, the remainder portion from the last utilizing operation being outputted from the register means as the resulting remainder, and the binary bits of the saved quotient portions stored in said register means being outputted from the register means as the resulting quotient.

2. In a digital computer, an apparatus for dividing a dividend in the form of a binary number by a predetermined constant yielding a resulting quotient and a resulting remainder, said binary number comprising a plurality of binary bits having upper bits and lower bits, the uppermost bit being a most significant bit and the lowermost bit being a least significant bit, said apparatus comprising:

(a) storage means, for storing a plurality of quantities, each quantity stored in an addressable location having a value associated therewith, each quantity including a quotient portion and a remainder portion corresponding to a division of the value of the addressable location by said predetermined constant;

(b) first switching means, having first, second, and third input terminals, said first input terminal adapted to receive said dividend in response to a first control signal, and said second input terminal adapted to receive the quantity from said storage means in response to a second control signal, for outputting preselected data bits received on said first, second, and third input terminals in response to said first and second control signals;

(c) register means, operatively connected to said first switching means and having output terminals operatively connected to said third input terminals of the first switching means, for temporarily storing the data received from said first switching means in response to a third control signal;

(d) gating means, operatively connected to the output terminals of said register means and to said storage means, for coupling preselected data bits temporarily stored in said register means to said storage means, said preselected data bits including a predetermined portion of the dividend which is being divided, the preselected data bits being the value of the addressable location of the storage means thereby causing the storage means to output corresponding quotient portion and remainder portion in response to a fourth control signal; and (e) output means, operatively connected to the output terminals of said register means, for providing an output signal comprising accumulated successive quotient portions temporarily stored in said register means, thereby yielding the resulting quotient and the resulting remainder in response to a fifth control signal.

* * * * *